US011528742B2

(12) United States Patent
Joseph et al.

(10) Patent No.: US 11,528,742 B2
(45) Date of Patent: Dec. 13, 2022

(54) SYSTEMS AND METHODS FOR AUTONOMOUS TRANSMISSION OF DEPRIORITIZED PROTOCOL DATA UNITS

(71) Applicant: QUALCOMM Incorporated, San Diego, CA (US)

(72) Inventors: Vinay Joseph, Calicut (IN); Ozcan Ozturk, San Diego, CA (US); Rajat Prakash, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/090,207

(22) Filed: Nov. 5, 2020

(65) Prior Publication Data

US 2021/0144751 A1    May 13, 2021

Related U.S. Application Data

(60) Provisional application No. 62/932,326, filed on Nov. 7, 2019.

(51) Int. Cl.
*H04W 72/14* (2009.01)
*H04W 72/04* (2009.01)
(Continued)

(52) U.S. Cl.
CPC ........ *H04W 72/14* (2013.01); *H04L 1/1812* (2013.01); *H04L 5/0053* (2013.01);
(Continued)

(58) Field of Classification Search
CPC ............ H04W 72/14; H04W 72/0413; H04W 72/1242; H04W 80/02; H04L 1/1812; H04L 5/0053
(Continued)

(56) References Cited

U.S. PATENT DOCUMENTS

2006/0168262 A1* 7/2006 Frazer .................. H04L 67/42
709/230
2010/0304733 A1* 12/2010 Yi ........................ H04L 1/1874
455/422.1

(Continued)

OTHER PUBLICATIONS

CATT: "Data/data Prioritization", 3GPP Draft, 3GPP TSG-RAN WG2 Meeting #107bis, R2-1912211 Data-Data Prioritization—Final, 3rd Generation Partnership Project (3GPP), Mobile Competence Centre, 650, Route Des Lucioles, F-06921, Sophia-Antipolis Cedex, France, vol. RAN WG2, No. Chongqing, P. R. China, Oct. 14, 2019-Oct. 18, 2019, Oct. 3, 2019 (Oct. 3, 2019), XP051803802, 5 pages ,Retrieved from the Internet: URL:https://ftp.3gpp.org/tsg_ran/WG2_RL2/TSGR2_107bis/Docs/R2-1912211.zip R2-1912211 data-data prioritization- final.docx.

(Continued)

*Primary Examiner* — Chi Tang P Cheng
(74) *Attorney, Agent, or Firm* — Haynes and Boone, LLP

(57) ABSTRACT

Wireless communications systems and methods relate to an automatic transmission scheme for a de-prioritized protocol data unit (PDU) when the originally assigned configured grant for the PDU is de-prioritized due to channel conflicts. Specifically, a user equipment may obtain a PDU for transmission over a first configured grant physical uplink shared channel (PUSCH) instance. The UE may then detect de-prioritization information that the first configured grant PUSCH instance is de-prioritized due to channel overlapping, and then automatically transmit the PDU originally associated with the first configured grant PUSCH instance over a second configured grant PUSCH instance.

28 Claims, 8 Drawing Sheets

(51) Int. Cl.
 H04W 80/02 (2009.01)
 H04L 5/00 (2006.01)
 H04W 72/12 (2009.01)
 H04L 1/18 (2006.01)
(52) U.S. Cl.
 CPC ... *H04W 72/0413* (2013.01); *H04W 72/1242* (2013.01); *H04W 80/02* (2013.01)
(58) Field of Classification Search
 USPC .......................................................... 370/329
 See application file for complete search history.

(56) References Cited

U.S. PATENT DOCUMENTS

| | | | |
|---|---|---|---|
| 2018/0084509 A1* | 3/2018 | Lee ..................... | H04W 52/365 |
| 2019/0215848 A1* | 7/2019 | Pan ..................... | H04W 76/38 |
| 2019/0253201 A1* | 8/2019 | Ye ..................... | H04W 28/0278 |
| 2021/0044391 A1* | 2/2021 | Lunttila ............ | H04W 72/1268 |

OTHER PUBLICATIONS

Ericsson: "Handling of De-Prioritized MAC PDUs", 3GPP Draft, 3GPP TSG-RAN WG2 #107bis, R2-1912554, Handling of De-Prioritized MAC PDUs, 3rd Generation Partnership Project (3GPP), Mobile Competence Centre, 650, Route Des Lucioles, F-06921, Sophia-Antipolis Cedex, France, vol. RAN WG2, No. Chongqing, China; Oct. 14, 2019-Oct. 18, 2019, Oct. 3, 2019, (Oct. 3, 2019), XP051803915, 5 pages, Retrieved from the Internet: URL: https://ftp.3gpp.org/tsg_ran/WG2_RL2/TSGR2_107bis/Docs/R2-1912554.zip R2-1912554 Handling of de-prioritized MAC PDUs.docx.

International Search Report and Written Opinion—PCT/US2020/059516—ISA/EPO—dated Feb. 12, 2021.

Nokia, et al.,"Handling of De-prioritized MAC PDUs", 3GPP Draft, 3GPP TSG-RAN WG2 #107, R2-1909499, Handling of De-prioritized MAC PDUs, 3rd Generation Partnership Project (3GPP), Mobile Competence Centre, 650, Route Des Lucioles, F-06921, Sophia-Antipolis Cedex, France, vol. RAN WG2, No. Prague, Czech Republic; Aug. 26, 2019- Aug. 30, 2019, Aug. 15, 2019 (Aug. 15, 2019), XP051767296, 3 pages, Retrieved from the Internet: URL: http://www.3gpp.org/ftp/tsg_ran/WG2_RL2/TSGR2_107/Docs/R2-1909499.zip [retrieved on Aug. 15, 2019].

Qualcomm, et al., "CR on Dynamic Grant Overriding Configured Grant", 3GPP Draft, 3GPP TSG RAN WG1 #96, 38214_CR0022R1_(REL-15)_R1-1903783, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Mar. 13, 2019, (Mar. 13, 2019), XP051690337, 4 pages, Retrieved from the Internet: URL: http://www.3gpp.org/ftp/tsg%5Fran/TSG%5FRAN/TSGR%5F83/Docs/RP%2D190450%2Ezip [retrieved on Mar. 13, 2019].

* cited by examiner

SYSTEMS AND METHODS FOR AUTONOMOUS TRANSMISSION OF DEPRIORITIZED PROTOCOL DATA UNITS

CROSS-REFERENCE(S)

The application is a nonprovisional of and claims priority under 35 U.S.C. 119 to U.S. provisional application No. 62/932,326, filed on Nov. 7, 2019, which is hereby expressly incorporated by reference herein in its entirety.

TECHNICAL FIELD

The application technology discussed below relates to wireless communication systems, and more particularly to autonomous transmission of deprioritized protocol data units (PDUs) when the original channel associated with the PDU was deprioritized due to channel overlapping.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes obtaining, at a user equipment (UE), a protocol data unit (PDU) for transmission over a first configured grant physical uplink shared channel (PUSCH) instance, detecting, at the UE, de-prioritization information that the first configured grant PUSCH instance is de-prioritized due to channel overlapping, and automatically transmitting the PDU originally associated with the first configured grant PUSCH instance over a second configured grant PUSCH instance.

In another aspect of the disclosure, a UE of wireless communication includes a processor and a transceiver. The processor is configured to obtain a protocol data unit (PDU) for transmission over a first configured grant physical uplink shared channel (PUSCH) instance, and detect, at the UE, de-prioritization information that the first configured grant PUSCH instance is de-prioritized due to channel overlapping. The transceiver is configured to automatically transmit the PDU originally associated with the first configured grant PUSCH instance over a second configured grant PUSCH instance.

In another aspect of the disclosure, a processor-readable non-transitory storage medium storing processor-executable instructions for wireless communication is disclosed. The instructions are executed by a processor to perform operations comprising obtaining, at UE, a protocol data unit (PDU) for transmission over a first configured grant PUSCH instance, detecting, at the UE, de-prioritization information that the first configured grant PUSCH instance is de-prioritized due to channel overlapping, and automatically transmitting the PDU originally associated with the first configured grant PUSCH instance over a second configured grant PUSCH instance.

In another aspect of the disclosure, a system of wireless communication includes means for obtaining, at UE, a protocol data unit (PDU) for transmission over a first configured grant PUSCH instance, means for detecting, at the UE, de-prioritization information that the first configured grant PUSCH instance is de-prioritized due to channel overlapping, and means for automatically transmitting the PDU originally associated with the first configured grant PUSCH instance over a second configured grant PUSCH instance.

Other aspects, features, and aspects of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
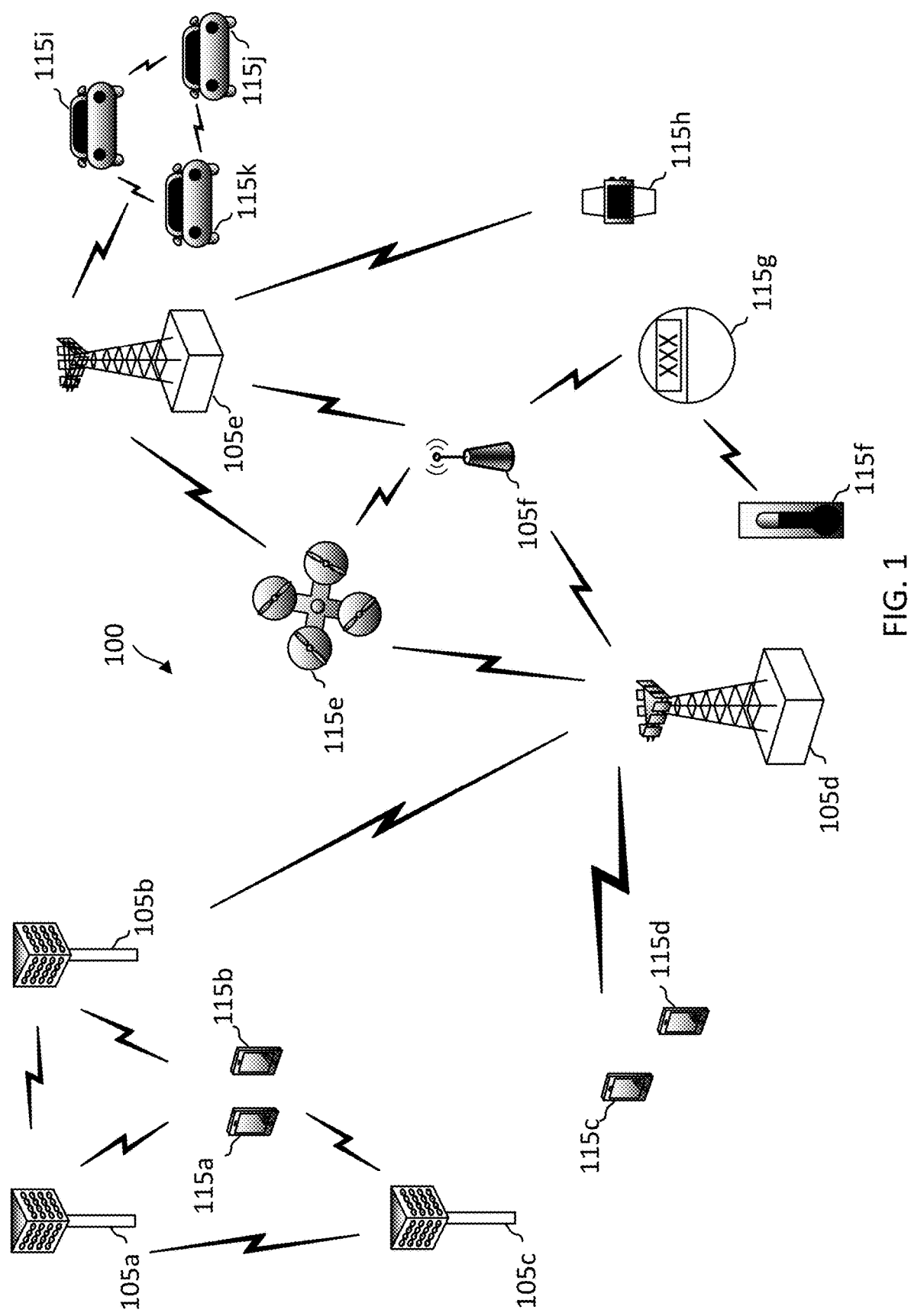
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
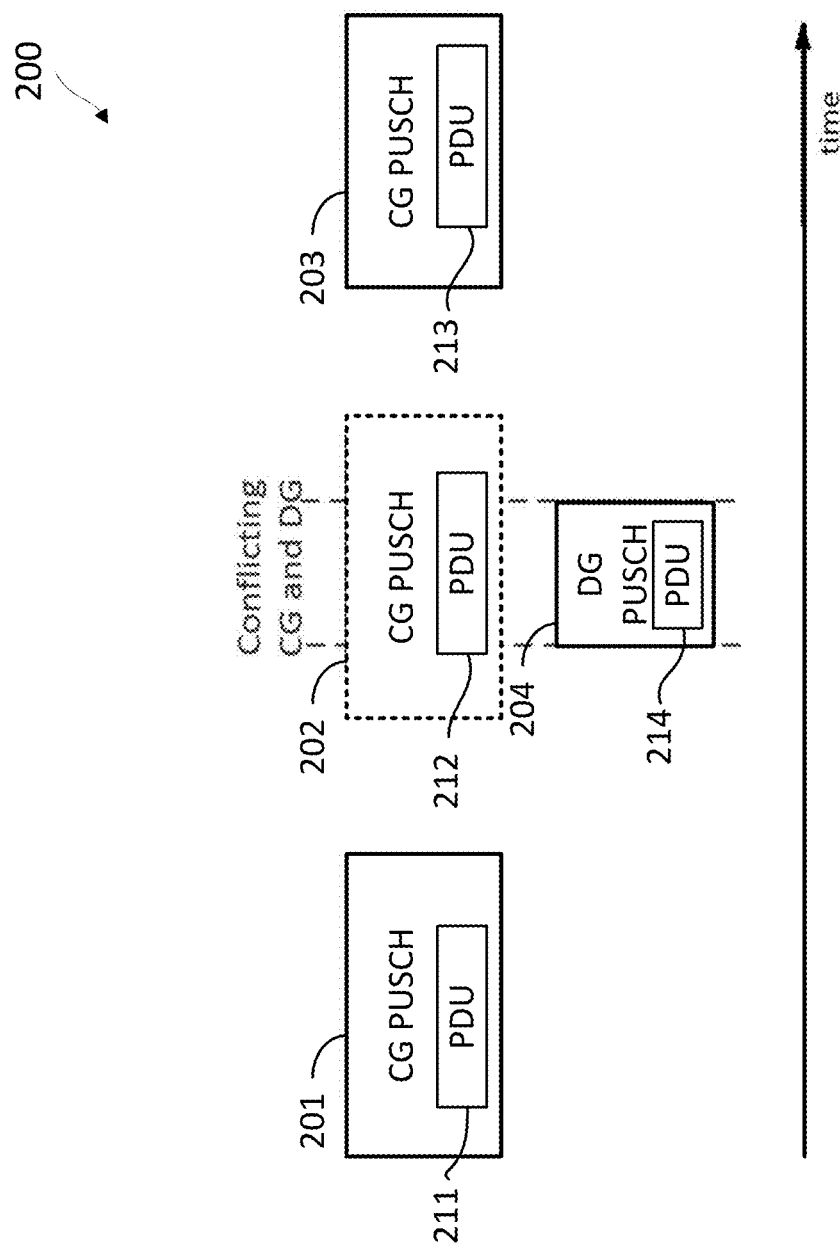
FIG. 2 illustrates a scenario when channel overlapping occurs in the wireless communication network shown in FIG. 1, according to aspects of the present disclosure.

FIG. 2 illustrates a scenario when channel overlapping occurs in the wireless communication network shown in FIG. 1, according to aspects of the present disclosure. As discussed in relation to FIG. 1, the BS 105 may configure UEs 115 with uplink grants for uplink data transmission. For example, as shown at diagram 200, the BS 105 may allocate the configured grant instances 201-203 (e.g., a configured grant occasion, or a configured grant PUSCH, etc.) to multiple UEs 115, and the UEs 115 may randomly utilize the instances 201-203 when each of them has data to transmit, e.g., each configured grant PUSCH 201-203 is associated with a PDU 211-213, respectively.

For another example, instead of using pre-scheduled configured grant instances allocated by the BS 105, when a UE 115 has a PDU to transmit, the UE 115 may transmit a service request to the BS 105, which may in turn allocate one or more dynamic uplink grants in a downlink control indicator (DCI) to the UE 115. The UE 115 may then transmit data (e.g., PDU 214) in the allocated dynamic uplink grant (e.g., 204).

Diagram 200 shows that the allocated channels for a configured grant 202 and a dynamic grant 204 may overlap in time, may be in the same serving cell of a UE, or may be in any serving cell of the UE. In this case, the 3GPP Release-16 proposes a prioritization scheme between overlapping channels, e.g., prioritizing one dynamic grant over another dynamic grant, one dynamic grant over configured grant, one configured grant over another configured grant, or service request/uplink control information (UCI) over physical uplink shared channel (PUSCH)/UCI when channels overlap. In the respective example, when the configured grant PUSCH instance 202 conflicts with the dynamic grant PUSCH instance 204, the prioritization scheme may prioritize the dynamic grant PUSCH instance 204 over the configured grant PUSCH instance 202, as illustrated by the dotted line of the configured grant PUSCH instance 202 when it is de-prioritized. In other examples, a configured grant PUSCH instance may be de-prioritized by a service request, a UCI (e.g., HARQ-ACK, etc.), and/or the like.

When the configured grant PUSCH instance 202 is de-prioritized, the PDU 212 that is originally assigned to the configured grant PUSCH instance 202 is also considered as de-prioritized. Thus, it remains an issue to allocate a resource to transmit the PDU 212.

In a wireless system, uplink transmission from one or more UEs to the BS may include configured grant transmission and/or dynamic grant transmissions. For example, multiple UEs are allowed to periodic resources for data transmission using the configured grant. The BS allocates the configured grant instances to multiple UEs, and the UEs may randomly utilize the instances when each of them has data to transmit. For another example, a UE may transmit a service request to the BS, which may in turn allocate one or more dynamic uplink grants in the downlink control indicator (DCI) to the UE. The UE may then transmit data in the allocated dynamic uplink grants.

In some cases, the configured grants and the dynamic grants may be allocated on overlapping channels and thus conflicts occur. For example, allocated channels for a configured grant and a dynamic grant may overlap in time, may be in the same serving cell of a UE, or may be in any serving cell of the UE. The 3rd Generation Partnership Project (3GPP) proposes a prioritization scheme between overlapping channels, e.g., prioritizing one dynamic grant over another dynamic grant, one dynamic grant over configured grant, one configured grant over another configured grant, or service request/uplink control information (UCI) over physical uplink shared channel (PUSCH)/UCI when channels overlap. However, when a channel, e.g., a configured grant PUSCH is deprioritized, the data unit that is already associated with the deprioritized channel cannot be transmitted without an allocated transmission resource. Therefore, there is a need to configure an autonomous transmission scheme for deprioritized data units when the originally assigned configured grant is deprioritized.

Existing systems does not permit the use of a configured grant instance (e.g., a basic configured grant according to 3GPP Release-15) to transmit a PDU generated for a previous configured grant instance, except when using repetitions which is pre-configured by the network—this is usually not triggered by unpredictable events such as de-prioritization of configured grants or LBT failure. In this case, the existing protocol only allows a PDU of a previous configured grant instance, e.g., PDU 212, to be sent using retransmission grants for the HARQ process associated with the previous configured grant instance. However, such mechanism requires the BS to send a retransmission grant (and DCI) to the UE, using up more PDCCH resources. In addition, the radio area network (RAN) does now know whether the configured grant PUSCH instance 202, which has been de-prioritized, has already been assigned a PDU or not. Thus, if the retransmission grant is sent by the BS to the UE every time when a configured grant PUSCH instance is de-prioritized, the PDCCH used for sending the retransmission grant is essentially wasted if the de-prioritized configured grant PUSCH instance does not has data to transmit.

In view of the need to configure automatic transmission scheme of PDU 212 when the associated configured grant PUSCH is de-prioritized, a UE-autonomous transmission of de-prioritized PDUs is provided, which may be in line with the transmission of PDUs which cannot be sent due to LBT failure. For example, in case of LBT failure, the UE keeps a timer referred to as configuredGrantRetransmissionTimer, in addition to the configuredGrantTimer supported by 3GPP Release-15. The duration of configuredGrantRetransmissionTimer is usually set to be smaller than the duration of configuredGrantTimer such that configuredGrantRetransmissionTimer would not expire before the configuredGrantTimer. When LBT failure occurs and the configuredGrantRetransmissionTimer expires, the current configured grant PUSCH may be used for retransmission of the PDU, even if the configuredGrantTimer is still running. If the LBT does not fail for the current configured grant PUSCH, an acknowledgement message is indicated by the BS for the configured grant PUSCH, and both the configuredGrantRetransmissionTimer and the configuredGrantTimer are stopped such that the next configured grant PUSCH can be used for an initial/new transmission. The concept of using two timers, e.g., configuredGrantRetransmissionTimer and the configuredGrantTimer are thus used to handle the automatic transmission of de-prioritized PDUs.

Figure 3:
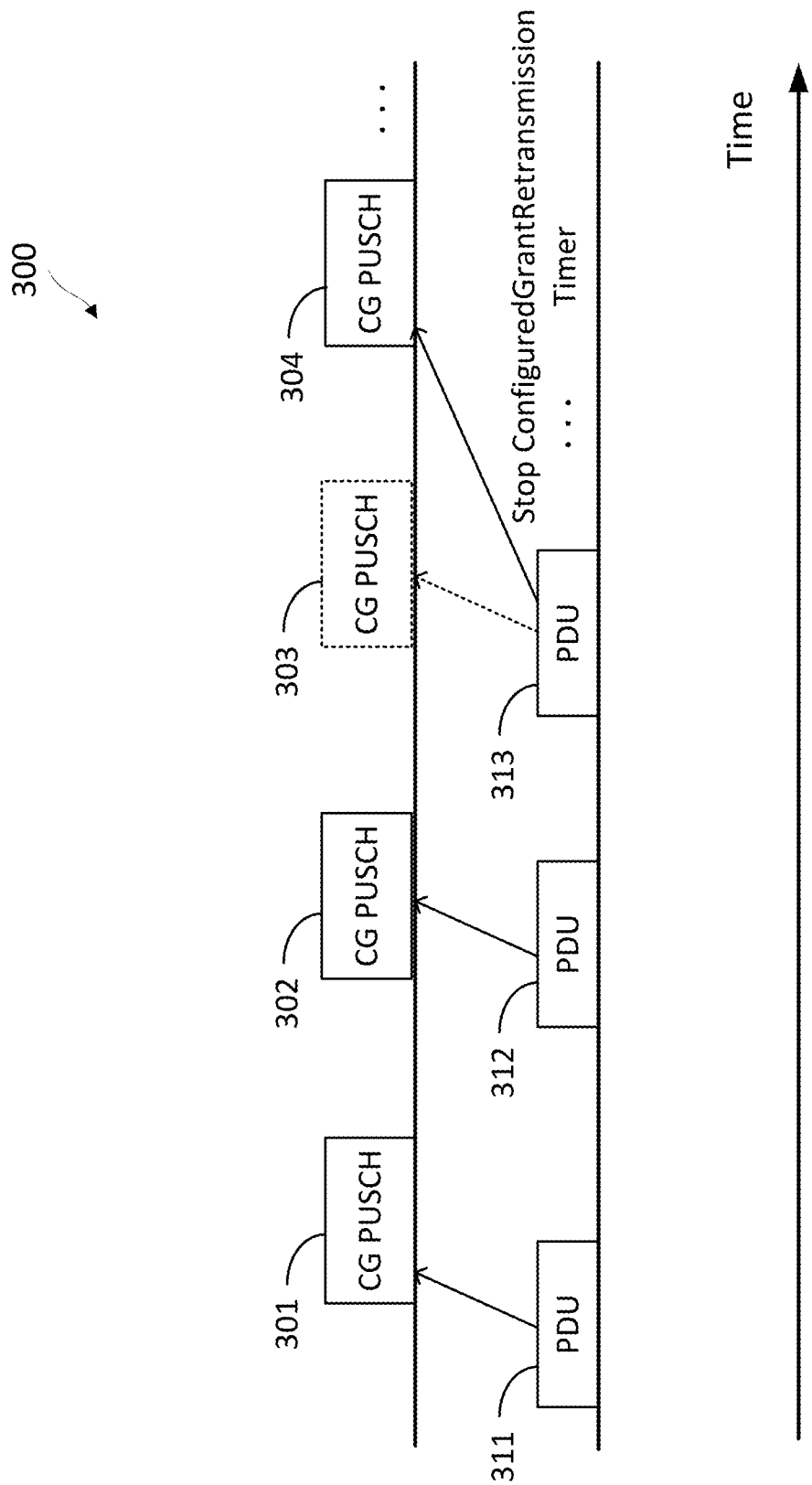
FIG. 3 illustrates an automatic data transmission scheme in response to the channel overlapping scenario shown in FIG. 2, according to aspects of the present disclosure.

FIG. 3 illustrates an automatic data transmission scheme in response to the channel overlapping scenario shown in FIG. 2, according to aspects of the present disclosure. Diagram 300 shows a number of configured grant PUSCH instances 301-303, each of which may be assigned to transmit a PDU 311-313, respectively. When a configured grant PUSCH instance 303 is de-prioritized, e.g., by a similar scenario as illustrated in FIG. 2 with regard to configured grant 202, instead of waiting for a retransmission grant, the UE may stop the configuredGrantRetransmissionTimer, which prompts the transmission of the PDU 313 in the next configured grant PUSCH instance 304.

In this way, the configuredGrantRetransmissionTimer is only stopped upon detecting of de-prioritization information, which is treated in a similar way as receiving a non-acknowledgement message from the BS. The UE does not need to wait for the BS to allocate a retransmission grant for transmitting the 4 de-prioritized PDU. The transmission latency and the resource efficiency can thus be improved.

Figure 4:
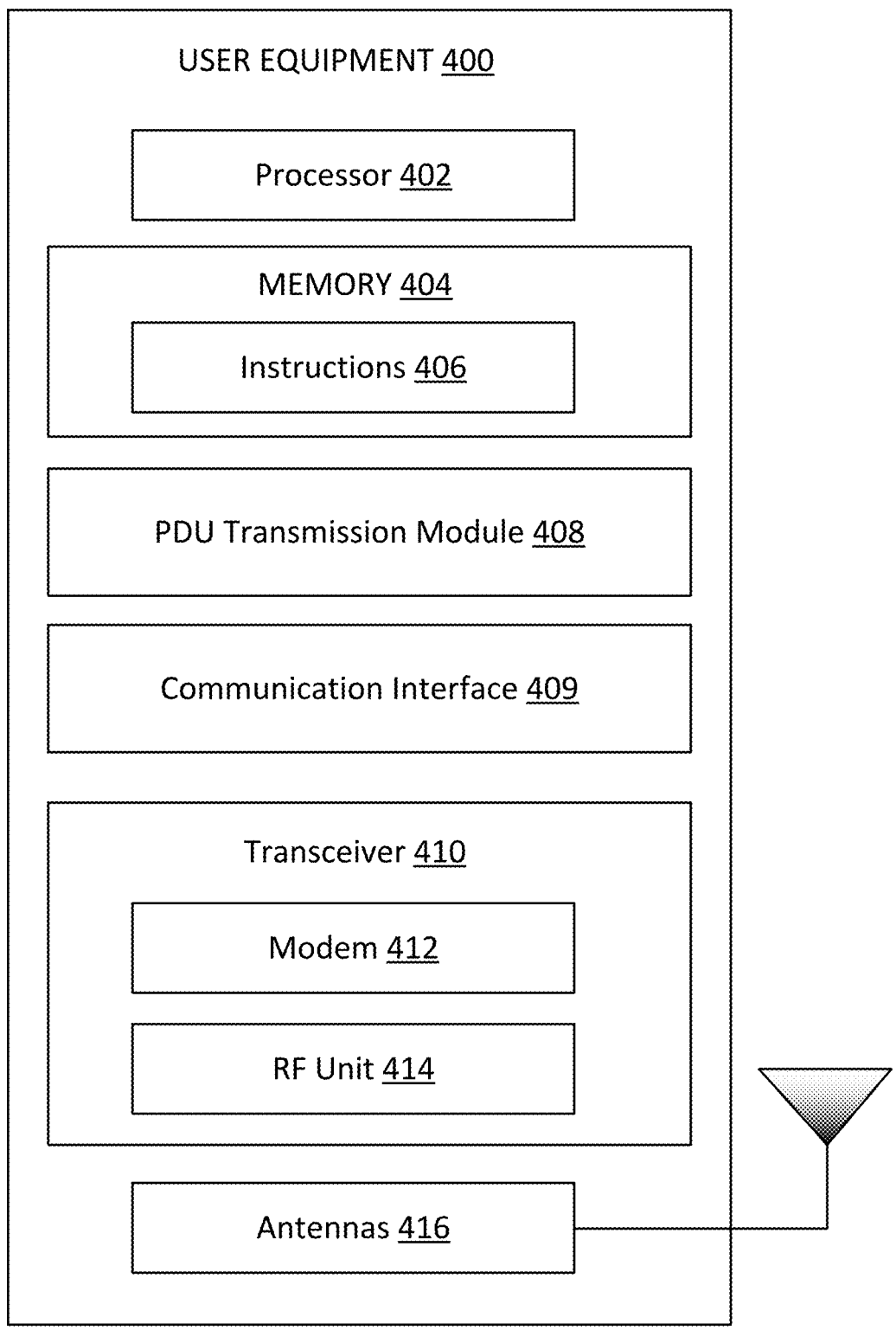
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or UE 202 shown in other figures, for example. As shown, the UE 400 may include a processor 402, a memory 404, a PDU transmission module 408, a communication interface 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 3A-3C and 6A-10. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The PDU transmission module 408 may communicate with the communication interface 409 to receive from or transmit messages to another device. Each of the PDU transmission module 408 and the communication interface 409 may be implemented via hardware, software, or combinations thereof. For example, each of the PDU transmission module 408 and the communication interface 409 may be implemented as a processor, circuit, and/or instructions 406 stored in the memory 404 and executed by the processor 402. In some examples, the PDU transmission module 408 and the communication interface 409 can be integrated within the modem subsystem 412. For example, the PDU transmission module 408 and the communication interface 409 can be implemented by a combination of software components (e.g., executed by a DSP or a general processor) and hardware components (e.g., logic gates and circuitry) within the modem subsystem 412. In some examples, a UE may include one of the PDU transmission module 408 and the communication interface 409. In other examples, a UE may include both the PDU transmission module 408 and the communication interface 409.

The PDU transmission module 408 and the communication interface 409 may be used for various aspects of the present disclosure, for example, aspects of FIGS. 2-3 and 6-8. The PDU transmission module 408 is configured to receive from a BS (e.g., 105) configured grants and/or dynamic grants. The PDU transmission module 408 is further configured to transmit PDUs over the configured grants and/or the dynamic grants to the BS. The PDU transmission module 408 is further configured to determine whether the transmission channels are overlapping and apply prioritization. When a configured grant PUSCH instance is de-prioritized, the PDF transmission module 408 is configured to transmit the de-prioritized PDU in another configured grant PUSCH instance.

The communication interface 409 is configured to coordinate with the PDU transmission module 408 to receive uplink or downlink scheduling grants from the BS, and/or communicate with the BS according to the uplink or downlink scheduling grants. The communication interface 409 is further configured to transmit PDUs to the BS.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the PDU transmission module 408, and/or the communication interface 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the PDU transmission module 408 and/or communication interface 409 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
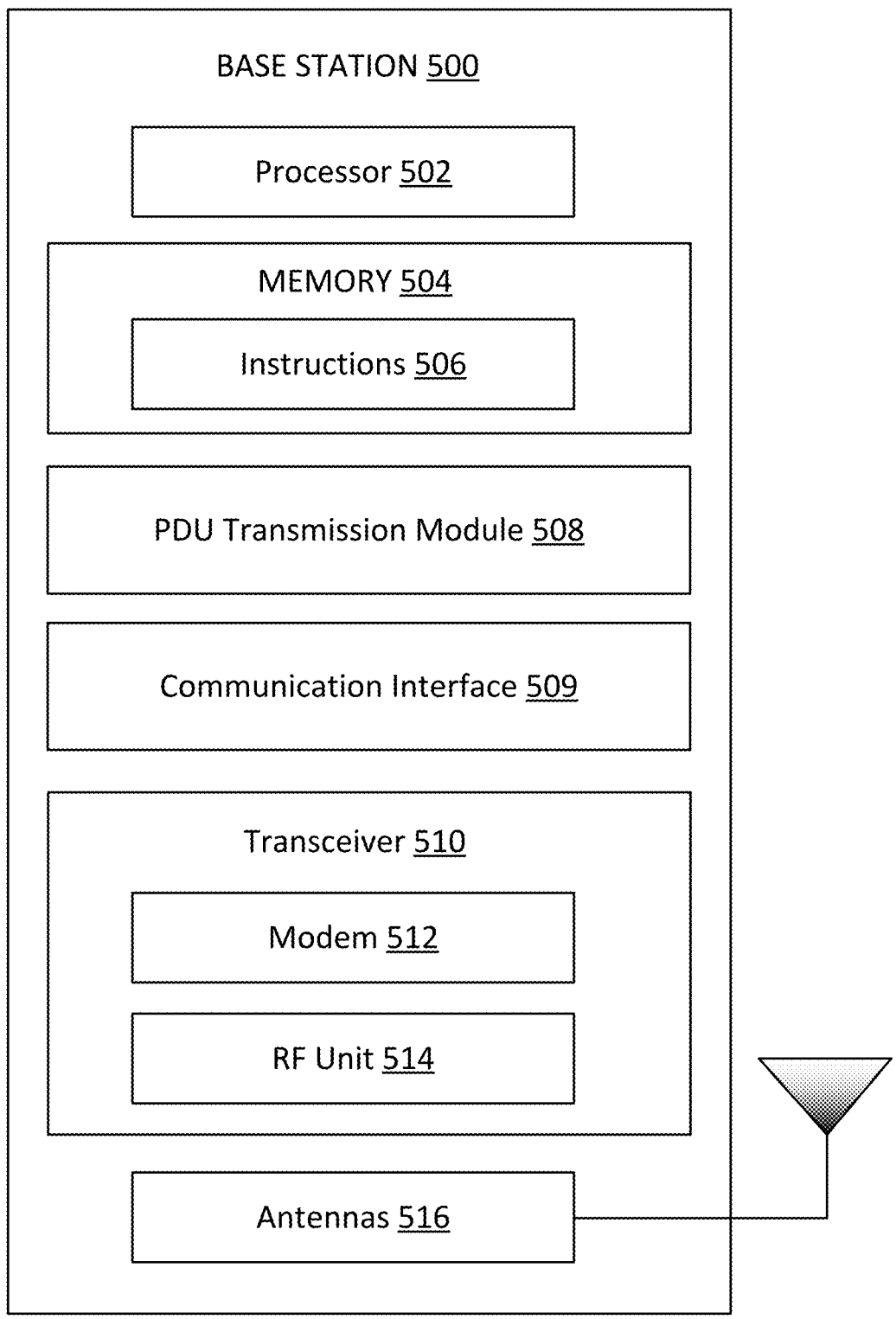
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1 and BS 204 described in other figures, for example. As shown, the BS 500 may include a processor 502, a memory 504, a PDU transmission module 508, a communication interface 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

The PDU transmission module 508 may communicate with the communication interface 509 to receive from or transmit messages to another device. Each of the PDU transmission module 508 and the communication interface 509 may be implemented via hardware, software, or combinations thereof. For example, each of the PDU transmission module 508 and the communication interface 509 may be implemented as a processor, circuit, and/or instructions 506 stored in the memory 504 and executed by the processor 502. In some examples, the PDU transmission module 508 and the communication interface 509 can be integrated within the modem subsystem 512. For example, the PDU transmission module 508 and the communication interface 509 can be implemented by a combination of software components (e.g., executed by a DSP or a general processor) and hardware components (e.g., logic gates and circuitry) within the modem subsystem 512. In some examples, a UE may include one of the PDU transmission module 508 and the communication interface 509. In other examples, a UE may include both the PDU transmission module 508 and the communication interface 509.

The PDU transmission module 508 and the communication interface 509 may be used for various aspects of the present disclosure, for example, aspects of FIGS. 2-3 and 6-8. The PDU transmission module 508 is configured to allocate and send uplink and/or downlink scheduling grants to UEs, and acknowledge or dis-acknowledge receipt of data from the UEs.

The communication interface 509 is configured to coordinate with the PDU transmission module 508 to transmit scheduling grants to the UE. The communication interface 509 is further configured to receive uplink data from the UE.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to aspects of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the PDU transmission module 508 and/or communication interface 509 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
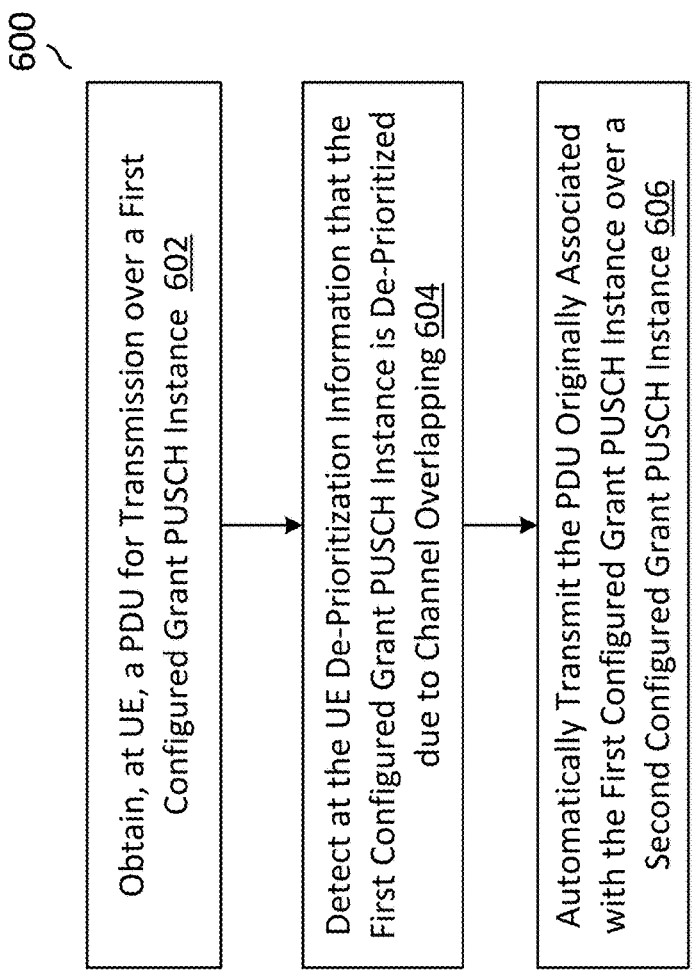
FIG. 6 illustrates a logic flow diagram performed by the UE corresponding to the automatic transmission scheme shown in FIG. 3, according to aspects of the present disclosure.

FIG. 6 illustrates a logic flow diagram performed by the UE corresponding to the automatic transmission scheme shown in FIG. 3, according to aspects of the present disclosure. Method 600 describes UE behavior for transmitting a de-prioritized PDU (e.g., 212 in FIG. 2, or 313 in FIG. 3) originally associated with a de-prioritized configured grant PUSCH instance using another configured grant PUSCH instance.

Steps of the method 600 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the PDU transmission module 408, the communication interface 409, the transceiver 410, the modem 412, and the one or more antennas 416, to execute the steps of method 600. The method 600 may employ in conjunction with diagram 300 described above with respect to FIG. 3. As illustrated, the method 600 includes a number of enumerated steps, but aspects of the method 600 include additional steps before, after, and in between the enumerated steps. In some aspects, one or more of the enumerated steps may be omitted or performed in a different order.

At step 602, a UE may obtain a PDU for transmission over a first configured grant PUSCH instance. For example, the first configured grant PUSCH instance may be a configured grant occasion, a configured grant PUSCH, etc. As shown in FIG. 3, the configured grant PUSCH 303 may be assigned to transmit PDU 313.

At step 604, the UE may detect de-prioritization information that the first configured grant PUSCH instance is de-prioritized due to channel overlapping. For example, as shown in FIG. 2, configured grant PUSCH 202 may be de-prioritized when the configured grant PUSCH 202 conflicts with dynamic grant PUSCH 214 in time. In some aspects, de-prioritization of a configured grant PUSCH may happen in the PHY layer, and thus the de-prioritization information is detected based on an indication from the PHY layer. In some aspects, the de-prioritization information may be detected based on an indication to the MAC layer.

At step 606, the de-prioritized PDU that is originally associated with the first configured grant PUSCH instance is automatically transmitted over a second configured grant PUSCH instance. For example, as shown in FIG. 3, the de-prioritized PDU 313 originally assigned to configured grant PUSCH 303 is then transmitted over the next configured grant PUSCH 304.

In some aspects, the first symbol of the second configured grant PUSCH instance (e.g., 304 in FIG. 3) starts at least a threshold duration apart from either the instance (e.g., 204 in FIG. 2) of de-prioritization or the end of the last symbol of the first configured grant PUSCH instance (e.g., 303 in FIG. 3). The threshold duration may be determined by the network. In this way, a minimum time gap between the originally assigned configured grant PUSCH instance and the next configured grant PUSCH instance used to transmit the de-prioritized PDU may be ensured. In some aspects, the threshold duration is determined based on the PUSCH preparation time (e.g., the time between DCI and the first symbol of a dynamic grant PUSCH). The threshold duration may be calculated by a function of sub-carrier spacing, which is defined in 3GPP TS 38.214.

In some aspects, the configured grant configuration of the first configured grant instance, e.g., the configured grant periodicity, repetitions, the configuredGrantTimer, the configuredGrantRetransmissionTimer, and/or the like, may be is determined or considered to be allowed based in part on the threshold duration.

In some aspects, the UE may determine whether the second configured grant PUSCH instance is able to transmit the de-prioritized PDU. For example, when the transport block size of the second configured grant PUSCH instance is smaller than the transport block size of the first configured grant PUSCH instance, or smaller than the size of the de-prioritized PDU, the UE may determine that the second configured grant PUSCH instance is unable to transmit the de-prioritized PDU and may discard the PDU. In another aspect, the transport block size of the second configured grant PUSCH instance may be different from the transport block size of the first configured grant PUSCH instance—which may happen at the activation or the update of the uplink configured grants.

In some aspects, the dep-prioritized PDU may be transmitted in the next configured grant PUSCH instance using the same, or a different HARQ process ID compared to that of the first configured grant PUSCH instance.

Figure 7:
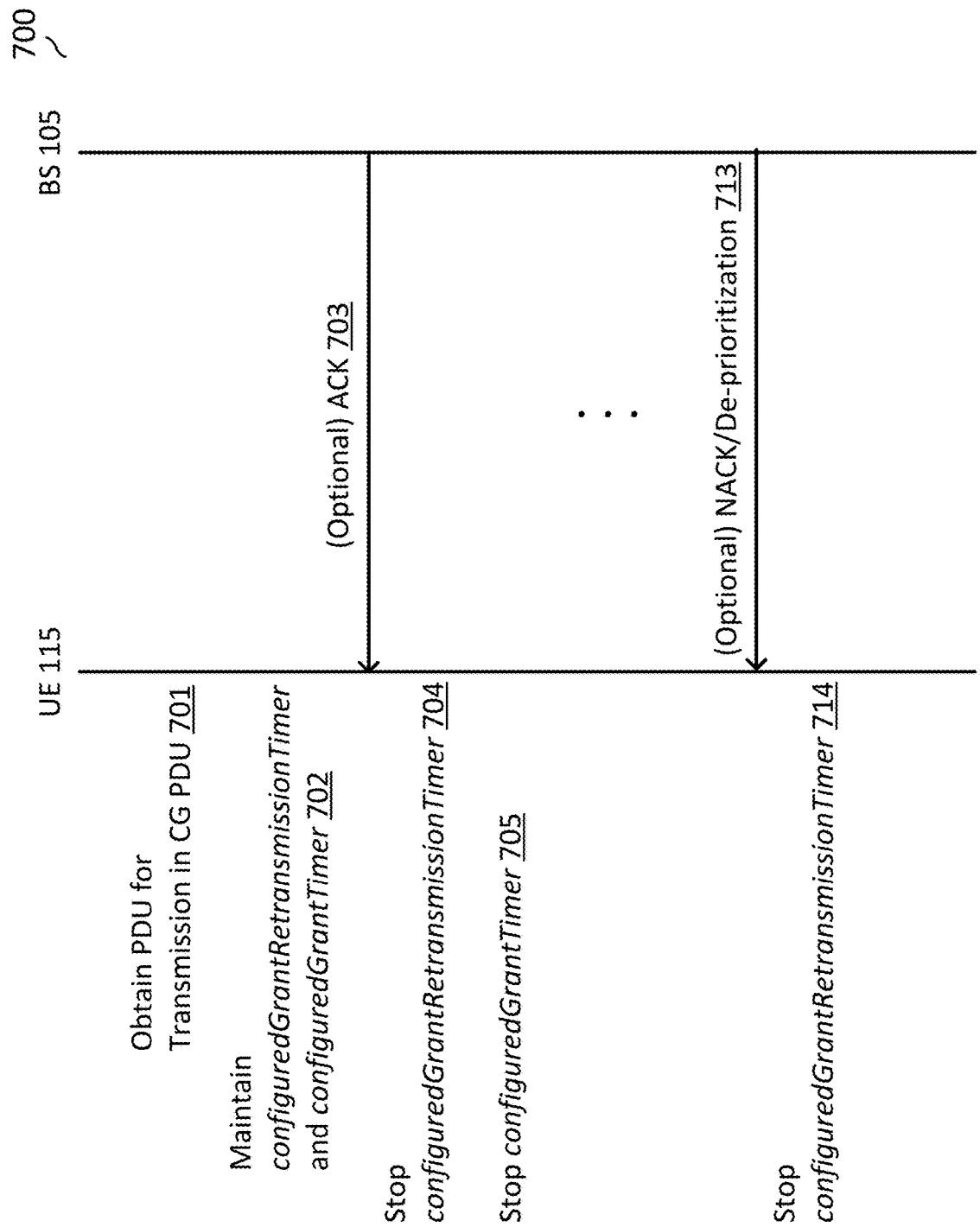
FIG. 7 illustrates a transmission timeline for implementing the automatic transmission scheme shown in FIG. 6, according to aspects of the present disclosure.

FIG. 7 illustrates a transmission timeline for implementing the automatic transmission scheme shown in FIG. 6, according to aspects of the present disclosure. Diagram 700 describes that method 600 in FIG. 6 may be realized by stopping a configuredGrantRetransmissionTimer on detecting de-prioritization information. In this way, the UE may treat de-prioritization in a similar way as receiving an NACK from the BS.

For example, diagram 700 shows that the UE 115 may obtain a PDU for transmission in a configured grant PUSCH at 701 (which is similar to step 602 in FIG. 6). The UE 115 may maintain two timers, configuredGrantRetransmissionTimer and configuredGrantTimer at 702. At 703, the HARQ process at UE 115 may receive downlink feedback information from BS 105, or de-prioritization information. If at 703 the feedback information is an ACK from BS 105, UE 115 may stop the configuredGrantRetransmissionTimer if the configuredGrantRetransmissionTimer has been running, and also stop the configuredGrantTimer if the configuredGrantTimer has been running. If at 713, an NACK is received from BS 105, or de-prioritization is indicated (e.g., via an indication from the PHY layer, or an indication to the MAC layer), UE 115 may stop the configuredGrantRetransmissionTimer if the configuredGrantRetransmissionTimer has been running at 714. In this way, when the configuredGrantRetransmissionTimer is stopped, UE 115 may transmit the de-prioritized PDU in a new/next configured grant PUSCH.

In some aspects, when ACK/NACK is available in a non-NR-U cases, the ACK 703 or NACK at 713 may be optional, but as long as de-prioritization information is detected, the UE may stop the configuredGrantRetransmissionTimer if the configuredGrantRetransmissionTimer has been running at 714.

In some aspects, the configuredGrantRetransmissionTimer is set to be equal to or greater than the configuredGrantTimer. In this way, the configuredGrantRetransmissionTimer does not expire before the configuredGrantTimer when there is no de-prioritization.

Figure 8:
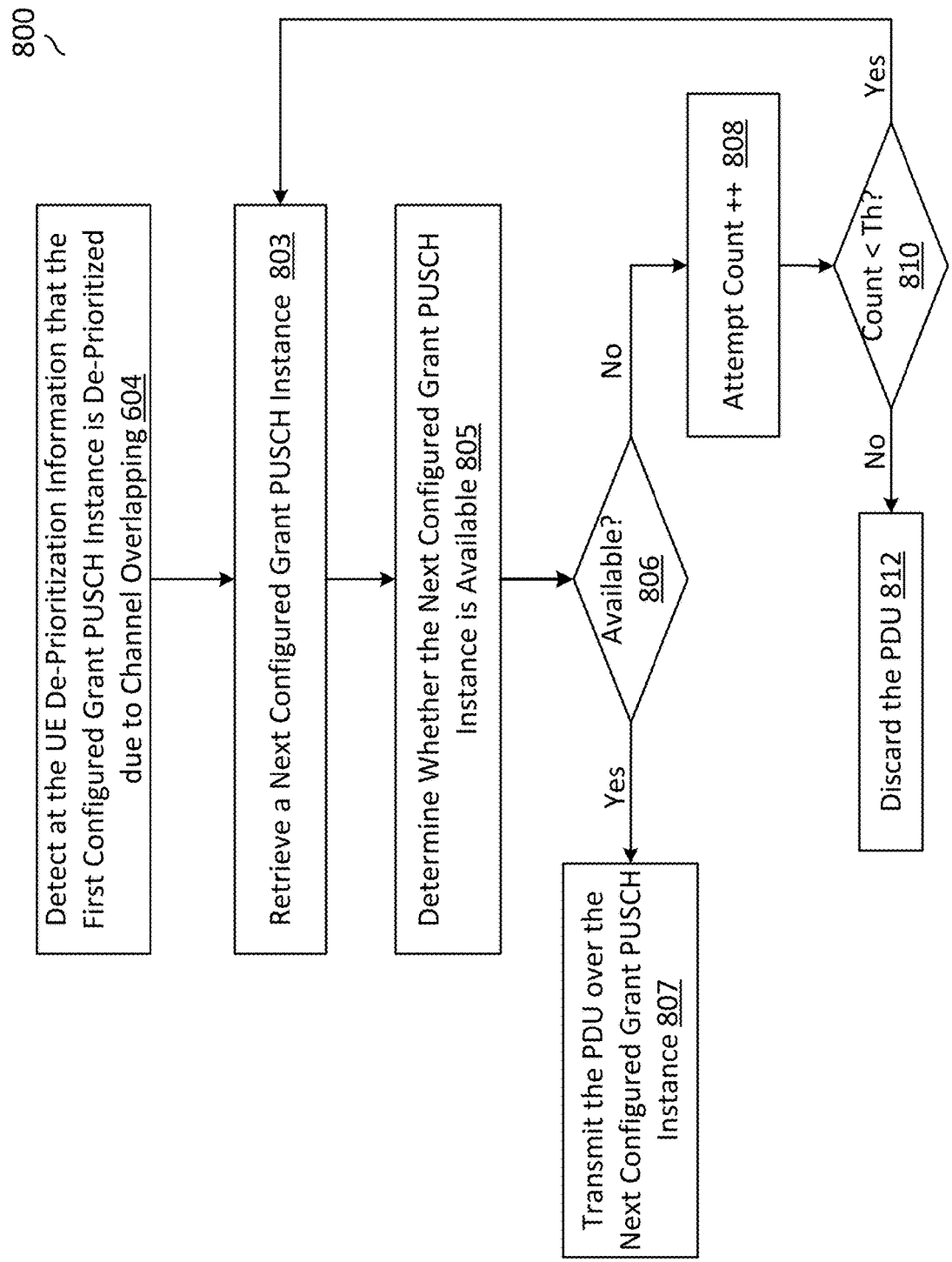
FIG. 8 illustrates a logic flow diagram performed by the UE corresponding to an alternative embodiments of automatic transmission scheme, according to aspects of the present disclosure.

FIG. 8 illustrates a logic flow diagram performed by the UE corresponding to an alternative embodiments of automatic transmission scheme, according to aspects of the present disclosure. Method 800 describes UE behavior for attempting to transmit a de-prioritized PDU (e.g., 212 in FIG. 2, or 313 in FIG. 3) originally associated with a de-prioritized configured grant PUSCH instance for a maximum number of times in next available configured grant PUSCH instances and then discards the PDU if no available configured grant PUSCH instance is found.

Steps of the method 800 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the PDU transmission module 408, the communication interface 409, the transceiver 410, the modem 412, and the one or more antennas 416, to execute the steps of method 600. The method 800 may employ in conjunction with diagram 300 described above with respect to FIG. 3. As illustrated, the method 800 includes a number of enumerated steps, but aspects of the method 800 include additional steps before, after, and in between the enumerated steps. In some aspects, one or more of the enumerated steps may be omitted or performed in a different order.

Method 800 may proceed from step 604 in FIG. 6. At step 803, the UE may retrieve a next configured grant PUSCH instance, e.g., configured grant 304 which is next in time to the de-prioritized configured grant 303. At 805, the UE may determine whether the next configured grant PUSCH instance is available, e.g., whether the next configured grant PUSCH instance is also de-prioritized, or has already been assigned to another PDU, etc.

At step 806, if the next configured grant PUSCH is available, method 800 proceeds to step 807, at which the UE transmits the de-prioritized PDU over the next configured grant PUSCH instance.

At step 808, if the next configured grant PUSCH is not available, the UE may optionally discard the PDU. Or alternatively, at step 808, the UE may keep track of the count of the total number of transmission attempts for the same PDU so far, e.g., by incrementing the attempt count by one. At step 810, if the total number of attempts is greater than a threshold number, the UE may then discard the PDU at step 812. Otherwise, if the total number of attempts is less than the threshold number, method 800 may repeat to step 803, at which the UE may look for another potential configured grant PUSCH instance. Thus, in this way, method 800 allows for a maximum threshold number of attempts before discarding the PDU. The threshold number may be configured by the network and transmitted from the BS to the UE via RRC signaling, system information, and/or the like.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
   obtaining, at a user equipment (UE), a protocol data unit (PDU) for transmission over a first configured grant physical uplink shared channel (PUSCH) instance;
   detecting, at the UE, de-prioritization information that the first configured grant PUSCH instance is de-prioritized due to channel overlapping;
   terminating, at the UE, a configured grant retransmission timer that has been running in response to receiving the de-prioritization information; and
   automatically transmitting the PDU originally associated with the first configured grant PUSCH instance over a second configured grant PUSCH instance without waiting for base station (BS) scheduling information that schedules a retransmission grant for transmitting the PDU.

2. The method of claim 1, wherein the configured grant retransmission timer is greater than or equal to the configured grant timer.

3. The method of claim 1, wherein the de-prioritization information is detected based on an indication from a physical layer of the UE.

4. The method of claim 1, wherein the de-prioritization information is detected based on an indication to a medium access control (MAC) layer of the UE.

5. The method of claim 1, wherein the second configured grant PUSCH instance has a first symbol starting at a time that is more than a threshold duration apart from an instance of de-prioritization or an end of a last symbol of the first configured grant PUSCH instance.

6. The method of claim 5, wherein the threshold duration is configured by a network.

7. The method of claim 6, wherein the threshold duration is configured by the network based on one or more of a PUSCH preparation time or sub-carrier spacing.

8. The method of claim 7, further comprising:
   discarding the PDU in response to determining that a threshold number of automatic transmission attempts of the PDU originally associated with the first configured grant PUSCH instance over a new configured grant PUSCH instance has been reached.

9. The method of claim 8, wherein the threshold number is configured by a network.

10. The method of claim 5, wherein the first configured grant instance is associated with a configured grant configuration that is determined or considered to be allowed based in part on the threshold duration.

11. The method of claim 10, wherein the configured grant configuration includes one or more of a configured grant periodicity, repetitions, a configured grant timer or a configured grant retransmission timer.

12. The method of claim 1, further comprising:
   in response to receiving additional de-prioritization information that the second configured grant PUSCH instance is also de-prioritized, automatically transmitting the PDU originally associated with the first configured grant PUSCH instance over a third configured grant PUSCH instance.

13. The method of claim 1, further comprising:
   discarding the PDU in response to determining that the second configured grant PUSCH instance is unable to transmit the PDU.

14. The method of claim 13, wherein the determining that the second configured grant PUSCH instance is unable to transmit the PDU comprises:
   determining that a transport block size of the second configured grant PUSCH instance is smaller than one of:
   a transport block size of the first configured grant PUSCH instance, and
   a size of the PDU.

15. A user equipment (UE) of wireless communication, comprising:
   a processor configured to:
      obtain a protocol data unit (PDU) for transmission over a first configured grant physical uplink shared channel (PUSCH) instance, and
      detect, at the UE, de-prioritization information that the first configured grant PUSCH instance is de-prioritized due to channel overlapping;
      terminate a configured grant retransmission timer that has been running in response to receiving the de-prioritization information; and
   a transceiver configured to automatically transmit the PDU originally associated with the first configured grant PUSCH instance over a second configured grant PUSCH instance without waiting for base station (BS) scheduling information that schedules a retransmission grant for transmitting the PDU.

16. The UE of claim 15, wherein the configured grant retransmission timer is greater than or equal to the configured grant timer.

17. The UE of claim 15, wherein the de-prioritization information is detected based on an indication from a physical layer of the UE.

18. The UE of claim 15, wherein the de-prioritization information is detected based on an indication to a medium access control (MAC) layer of the UE.

19. The UE of claim 15, wherein the second configured grant PUSCH instance has a first symbol starting at a time that is more than a threshold duration apart from an instance of de-prioritization or an end of a last symbol of the first configured grant PUSCH instance.

20. The UE of claim 19, wherein the threshold duration is configured by a network.

21. The UE of claim 20, wherein the threshold duration is configured by the network based on one or more of a PUSCH preparation time or sub-carrier spacing.

22. The UE of claim 21, wherein the processor is further configured to:
   discard the PDU in response to determining that a threshold number of automatic transmission attempts of the PDU originally associated with the first configured grant PUSCH instance over a new configured grant PUSCH instance has been reached.

23. The UE of claim 19, wherein the first configured grant instance is associated with a configured grant configuration that is determined or considered to be allowed based in part on the threshold duration.

24. The UE of claim 23, wherein the configured grant configuration includes one or more of a configured grant periodicity, repetitions, a configured grant timer or a configured grant retransmission timer.

25. The UE of claim 15, wherein the transceiver is further configured to:

in response to receiving additional de-prioritization information that the second configured grant PUSCH instance is also de-prioritized, automatically transmit the PDU originally associated with the first configured grant PUSCH instance over a third configured grant PUSCH instance.

26. The UE of claim 15, wherein the processor is further configured to:
   determine that the second configured grant PUSCH instance is unable to transmit the PDU by:
      determining that a transport block size of the second configured grant PUSCH instance is smaller than one of:
   a transport block size of the first configured grant PUSCH instance, and
   a size of the PDU.

27. A processor-readable non-transitory storage medium storing processor-executable instructions for wireless communication, the instructions being executed by a processor to perform operations comprising:
   obtaining, at a user equipment (UE), a protocol data unit (PDU) for transmission over a first configured grant physical uplink shared channel (PUSCH) instance;
   detecting, at the UE, de-prioritization information that the first configured grant PUSCH instance is de-prioritized due to channel overlapping;
   terminate a configured grant retransmission timer that has been running in response to receiving the de-prioritization information; and automatically transmitting the PDU originally associated with the first configured grant PUSCH instance over a second configured grant PUSCH instance without waiting for base station (BS) scheduling information that schedules a retransmission grant for transmitting the PDU.

28. A system of wireless communication, comprising:
   means for obtaining, at a user equipment (UE), a protocol data unit (PDU) for transmission over a first configured grant physical uplink shared channel (PUSCH) instance;
   means for detecting, at the UE, de-prioritization information that the first configured grant PUSCH instance is de-prioritized due to channel overlapping;
   means for terminating a configured grant retransmission timer that has been running in response to receiving the de-prioritization information; and
   means for automatically transmitting the PDU originally associated with the first configured grant PUSCH instance over a second configured grant PUSCH instance without waiting for base station (BS) scheduling information that schedules a retransmission grant for transmitting the PDU.

* * * * *